US008194900B2

(12) United States Patent
Fischer et al.

(10) Patent No.: US 8,194,900 B2
(45) Date of Patent: Jun. 5, 2012

(54) METHOD FOR OPERATING A HEARING AID, AND HEARING AID

(75) Inventors: Eghart Fischer, Schwabach (DE); Matthias Fröhlich, Erlangen (DE); Jens Hain, Kleinsendelbach (DE); Henning Puder, Erlangen (DE); André Steinbuß, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1274 days.

(21) Appl. No.: 11/973,578

(22) Filed: Oct. 9, 2007

(65) Prior Publication Data

US 2008/0107297 A1 May 8, 2008

(30) Foreign Application Priority Data

Oct. 10, 2006 (DE) ........................ 10 2006 047 982

(51) Int. Cl.
*H04R 25/00* (2006.01)
*H04B 15/00* (2006.01)

(52) U.S. Cl. .......... 381/313; 381/92; 381/317; 381/94.1

(58) Field of Classification Search ........................ None
See application file for complete search history.

(56) References Cited

U.S. PATENT DOCUMENTS 4,032,711 A 6/1977 Sambur
4,837,830 A * 6/1989 Wrench et al. ................ 704/238
5,214,707 A 5/1993 Fujimoto et al.
6,327,347 B1 12/2001 Gutzmann
7,319,769 B2 1/2008 Allegro-Baumann et al.
7,457,426 B2 * 11/2008 Drtina ........................... 381/313
2002/0009103 A1 1/2002 Toida
2003/0138116 A1 7/2003 Jones et al.
2006/0120535 A1 6/2006 Puder
2006/0126872 A1 * 6/2006 Allegro-Baumann et al. ............................. 381/312

FOREIGN PATENT DOCUMENTS

CN 1261759 A 8/2000
DE 69926977 T2 4/2006
EP 0472356 A1 2/1992
EP 1017253 A2 7/2000
EP 1303166 A2 4/2003
EP 1655998 A2 5/2006
EP 1670285 A2 6/2006
WO 0187011 A2 11/2001

OTHER PUBLICATIONS

Joseph P Campbell Jr, "Speaker Recognition: A Tutorial" IEEE, vol. 85, No. 9, Sep. 1997, pp. 1437-1462, XP011043880, Paragraph "Introduction"—1455, paragraph: "A New Speaker Recognition System".

* cited by examiner

*Primary Examiner* — Hoang-Quan Ho

(57) ABSTRACT

A "speaker" operating mode is established by a signal processor of a hearing aid for tracking and selecting an acoustic speaker source in an ambient sound. Electric acoustic signals are generated by the hearing aid from the ambient sound that has been picked up, from which signals an electric speaker signal is selected by the signal processor by a database of speech profiles of preferred speakers. The electric speech signal is selectively taken into account in an output sound of the hearing aid in such a way that it will for the hearing-aid wearer acoustically at least be prominent compared with another acoustic source and consequently be better perceived by the hearing-aid wearer.

9 Claims, 3 Drawing Sheets

METHOD FOR OPERATING A HEARING AID, AND HEARING AID

CROSS REFERENCE TO RELATED APPLICATIONS

This application claims priority of German application 102006047982.3 DE filed Oct. 10, 2006, which is incorporated by reference herein in its entirety.

FIELD OF INVENTION

The invention relates to a method for operating a hearing aid consisting of a single hearing device or two. The invention relates further to a corresponding hearing aid or hearing device.

BACKGROUND OF INVENTION

When we listen to someone or something, interference noise or undesired acoustic signals are everywhere present that interfere with the voice of someone opposite us or with a desired acoustic signal. People with a hearing impairment are especially susceptible to such interference noise. Background conversations, acoustic disturbance from digital devices (cell phones), or noise from automobiles or other ambient sources can make it very difficult for a hearing-impaired person to understand a wanted speaker. A reduction of the noise level in an acoustic signal coupled with an automatic focusing on a desired acoustic signal component can significantly improve the efficiency of an electronic speech processor of the type used in modern hearing aids.

Hearing aids have very recently been introduced that employ digital signal processing. They contain one or more microphones, A/D converters, digital signal processors, and loudspeakers. The digital signal processors usually divide the incoming signals into a plurality of frequency bands. An amplification and processing of signals can be individually adjusted within each band in keeping with requirements for a specific wearer of the hearing aid in order to improve a specific component's intelligibility. Further available in connection with digital signal processing are algorithms for minimizing feedback and interference noise, although they have significant disadvantages. What is disadvantageous about the currently employed algorithms for minimizing interference noise is, for example, the maximum improvement they can achieve in hearing-aid acoustics when speech and background noise are located within the same frequency region, which renders them incapable of distinguishing between spoken language and background noise. (See also EP 1 017 253 A2)

That is one of the most frequently occurring problems in acoustic signal processing, namely filtering out one or more acoustic signals from among different such signals that overlap. The problem is referred to also as what is termed the "cocktail party problem". All manner of different sounds including music and conversations therein merge into an indefinable acoustic backdrop. People nevertheless generally do not find it difficult to hold a conversation in such a situation. It is therefore desirable for hearing-aid wearers to be able to converse in just such situations like people without a hearing impairment.

Within acoustic signal processing there exist spatial (directional microphone, beam forming, for instance), statistical (blind source separation, for instance), and hybrid methods which, by means of algorithms and otherwise, are able to separate out one or more sound sources from among a plurality of simultaneously active such sources. Thus by means of statistical signal processing performed on at least two microphone signals, blind source separation enables source signals to be separated without prior knowledge of their geometric arrangement. When applied to hearing aids, that method has advantages over conventional approaches based on a directional microphone. With said type of BSS (Blind Source Separation) method it is inherently possible with n microphones to separate up to n sources, meaning to generate n output signals.

Known from the relevant literature are blind source separation methods wherein sound sources are analyzed by analyzing at least two microphone signals. A method of said type and a corresponding device therefore are known from EP 1 017 253 A2, the scope of whose disclosure is expressly to be included in the present specification. Relevant links from the invention to EP 1 017 253 A2 are indicated chiefly at the end of the present specification.

In a specific application for blind source separation in hearing aids, that requires two hearing devices to communicate (analyzing of at least two microphone signals (right/left)) and both hearing devices' signals to be evaluated preferably binaurally, which is performed preferably wirelessly. Alternative couplings of the two hearing devices are also possible in an application of said type. A binaural evaluating of said kind with a provisioning of stereo signals for a hearing-aid wearer is disclosed in EP 1 655 998 A2, the scope of whose disclosure is likewise to be included in the present specification. Relevant links from the invention to EP 1 655 998 A2 are indicated at the end of the present specification.

The controlling of directional microphones for performing a blind source separation is subject to equivocality once a plurality of competing useful sources, for example speakers, are presented simultaneously. While blind source separation basically allows the different sources to be separated, provided they are spatially separate, the potential benefit of a directional microphone is reduced by said equivocality, although a directional microphone can be of great benefit in improving speech intelligibility specifically in such scenarios.

SUMMARY OF INVENTION

The hearing aid or, as the case may be, the mathematical algorithms for blind source separation is/are basically faced with the dilemma of having to decide which of the signals produced through blind source separation can be forwarded to the algorithm user, meaning the hearing-aid wearer, to greatest advantage. That is basically an insoluble problem for the hearing aid because the choice of desired acoustic source will depend directly on the hearing-aid wearer's momentary will and hence cannot be available to a selection algorithm as an input variable. The choice made by said algorithm must accordingly be based on assumptions about the listener's likely will.

The prior art proceeds from the hearing-aid wearer's preferring an acoustic signal from a 0° direction, meaning from the direction in which he/she is looking. That is realistic insofar as the hearing-aid wearer would in an acoustically difficult situation look toward his/her current conversation partner in order to obtain further cues (for example lip movements) for enhancing said partner's speech intelligibility. The hearing-aid wearer will, though, consequently be compelled to look at his/her conversation partner so that the directional microphone will produce an enhanced speech intelligibility. That is annoying particularly when the hearing-aid wearer wishes to converse with precisely one person, which is to say is not involved in communicating with a plurality of speakers, and does not always wish/have to look at his/her conversation partner.

Furthermore, there is to date no known technical method for making a "correct" choice of acoustic source or, as the case may be, one preferred by the hearing-aid wearer, after source separating has taken place.

On the assumption that spoken language from known speakers is of more interest to hearing-aid wearers than spoken language from unknown speakers or non-verbal acoustic signals, a more flexible acoustic signal selection method can be formulated that is not limited by a geometric acoustic source arrangement. An object of the invention is therefore to disclose an improved method for operating a hearing aid, and an improved hearing aid. Which electric output signal resulting from a source separation, in particular a blind source separation, is acoustically routed to the hearing-aid wearer is especially an object of the invention. It is hence an object of the invention to discover which is very probably a preferred acoustic speaker source for the hearing-aid wearer.

A choice of acoustic speaker source requiring to be rendered is inventively made to the effect that—if present—a preferred speaker, or one known to the hearing-aid wearer, will always be rendered by the hearing aid. Inventively created therefore is a database of profiles of an individual such preferred speaker or of a plurality thereof. For the output signals of a source separation means, acoustic profiles are then determined or evaluated and compared with the entries in the database. If one of the output signals of the source separation means matches the or a database profile, then explicitly that electric acoustic signal or that speaker will be selected and made available to the hearing-aid wearer via the hearing aid. A decision of said type can have priority over other decisions having a lower decision ranking for a case such as that.

A method for operating a hearing aid is inventively provided, wherein for tracking and selectively amplifying an acoustic speaker source or electric speaker signal a comparison is made by signal processing means of the hearing aid preferably for all electric acoustic signals available to it with speech profiles of required or known speakers, with the speech profiles being stored in a database located preferably in the hearing device or devices of the hearing aid. The acoustic speaker source or sources very closely matching the speech profiles in the database will be tracked by the signal processing means and taken particularly into account in an acoustic output signal of the hearing aid.

Further inventively provided is a hearing aid wherein electric acoustic signals can by means of an acoustic module (signal processing means) of the hearing aid be aligned with speech profile entries in a database. From among the electric acoustic signals the acoustic module for that purpose selects at least one electric speaker signal matching a required or known speaker's speech profile, with that electric speaker signal's being able to be taken particularly into account in an output signal of the hearing aid.

It is inventively possible, depending on the number of microphones in the hearing aid, to select one or more acoustic speaker sources from within the ambient sound and emphasize it/them in the hearing aid's output sound. It is possible therein to flexibly adjust a volume of the acoustic speaker source or sources in the hearing aid's output sound.

In a preferred exemplary embodiment of the invention the signal processing means has an unmixer module that operates preferably as a device for blind source separation for separating the acoustic sources within the ambient sound. The signal processing means further has a post-processor module which, when an acoustic source very probably containing a speaker is detected, will set up a corresponding "speaker" operating mode in the hearing aid. The signal processing means can further have a pre-processor module—whose electric output signals are the unmixer module's electric input signals—which standardizes and conditions electric acoustic signals originating from microphones of the hearing aid. As regards the pre-processor module and unmixer module, reference is made to EP 1 017 253 A2 paragraphs [0008] to [0023].

The speech profiles stored in the database are inventively compared with the acoustic profiles currently being received by the hearing aid, or the profiles, currently being generated by the signal processing means, of the electric acoustic signals are aligned with the speech profiles stored in the database. That is done preferably by the signal processing means or the post-processor module, with the database possibly being part of the signal processing means or post-processor module or part of the hearing aid. The post-processor module tracks and selects the electric speaker signal or signals and generates a corresponding electric output acoustic signal for a loudspeaker of the hearing aid.

In a preferred embodiment of the invention the hearing aid has a data interface via which it can communicate with a peripheral device. That makes it possible, for instance, to exchange speech profiles of the required or known speakers with other hearing aids. It is furthermore possible to process speech profiles in a computer and then in turn transfer them to the hearing aid and thereby update it. The limited memory space in the hearing aid can furthermore be better utilized by means of the data interface because an external processing and hence a "slimming down" of the speech profiles will be enabled thereby. A plurality of databases of different speech profiles—private and business, for instance—can moreover be set up on an external computer and the hearing aid thus configured accordingly for a forthcoming situation.

By switching the hearing aid into a training mode, it or the signal processing means can be trained to a new speaker's speech characteristics. It is furthermore also possible to create additional speech profiles of the same speaker, which will be advantageous for different acoustic situations, for example close/distant.

For the eventuality of several or too many or no preferred speakers' being recognized, the hearing aid or signal processing means has a device that will make an appropriate, subordinate choice of acoustic source. A subordinate choice of acoustic source of said type could be, for example, such that when (unknown) speech has been recognized in an electric acoustic signal, the speaker or speakers located where the hearing-aid wearer is looking will be selected. Said subordinate decision can furthermore be made based on which speaker is most possibly in the hearing-aid wearer's vicinity or is talking loudest.

Should the hearing aid include a remote control, then the database can be provided therein. The hearing aid can as a result be overall of smaller design and offer more memory space for speech profiles. The remote control can therein communicate with the hearing aid wirelessly or in a wired manner.

Additional preferred exemplary embodiments of the invention will emerge from the other dependent claims.

BRIEF DESCRIPTION OF THE DRAWINGS

The invention is explained in more detail below with the aid of exemplary embodiments and with reference to the attached drawing.

DETAILED DESCRIPTION OF INVENTION

Within the scope of the invention (FIGS. 2 & 3), the following speaks mainly of a BSS module that corresponds to a module for a blind source separation. The invention is not, though, limited to a blind source separation of said type but is intended broadly to encompass source separation methods for acoustic signals in general. Said BSS module is therefore referred to also as an unmixer module.

The following speaks also of a "tracking" of an electric speaker signal by a hearing-aid wearer's hearing aid. What is to be understood thereby is a selection made by a hearing aid or by a signal processing means of the hearing aid or by a post-processor module of the signal processing means of one or more electric speaker signals that are electrically or electronically selected by the hearing aid from other acoustic sources in the ambient sound and which are rendered in a manner amplified with respect to the other acoustic sources in the ambient sound, which is to say in a manner experienced as louder for the hearing-aid wearer. Preferably no account is taken by the hearing aid of a position of the hearing-aid wearer in space, in particular a position of the hearing aid in space, which is to say a direction in which the hearing-aid wearer is looking, while the electric speaker signal is being tracked.

Figure 1:
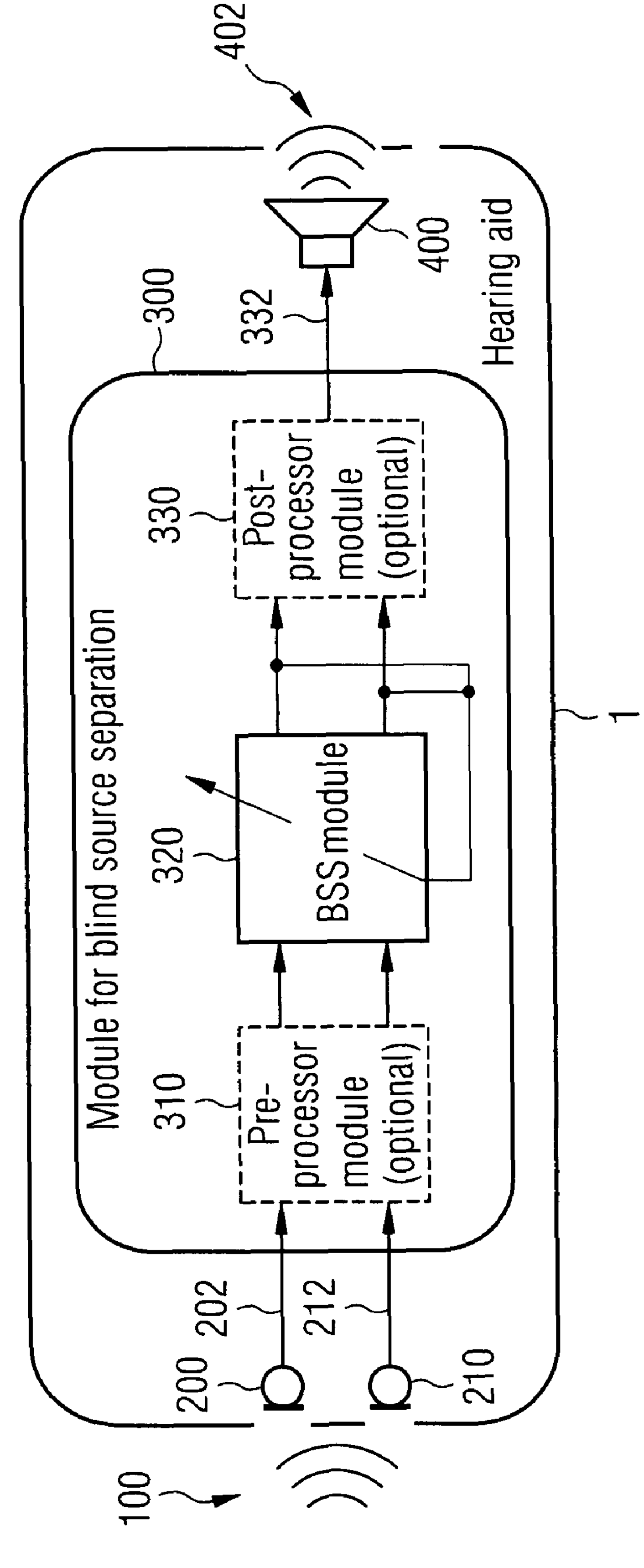
FIG 1 Prior art
FIG. 1 is a block diagram of a hearing aid according to the prior art having a module for a blind source separation.

FIG. 1 shows the prior art as disclosed in EP 1 017 253 A2 (see therein paragraph [0008]ff). A hearing aid 1 therein has two microphones 200, 210, which can together form a directional microphone system, for generating two electric acoustic signals 202, 212. A microphone arrangement of said type gives the two electric output signals 202, 212 of the microphones 200, 210 an inherent directional characteristic. Each of the microphones 200, 210 picks up an ambient sound 100 which is an assemblage of unknown, acoustic signals from an unknown number of acoustic sources.

The electric acoustic signals 202, 212 are in the prior art mainly conditioned in three stages. The electric acoustic signals 202, 212 are in a first stage pre-processed in a pre-processor module 310 for improving the directional characteristic, starting with standardizing the original signals (equalizing the signal strength). A blind source separation takes place at a second stage in a BSS module 320, with the output signals of the pre-processor module 310 being subjected to an unmixing process. The output signals of the BSS module 320 are thereupon post-processed in a post-processor module 330 in order to generate a desired electric output signal 332 serving as an input signal for a listening means 400 or a loudspeaker 400 of the hearing aid 1 and to deliver a sound generated thereby to the hearing-aid wearer. According to the specification in EP 1 017 253 A2, steps 1 and 3, meaning the pre-processor module 310 and post-processor module 330, are optional.

Figure 2:
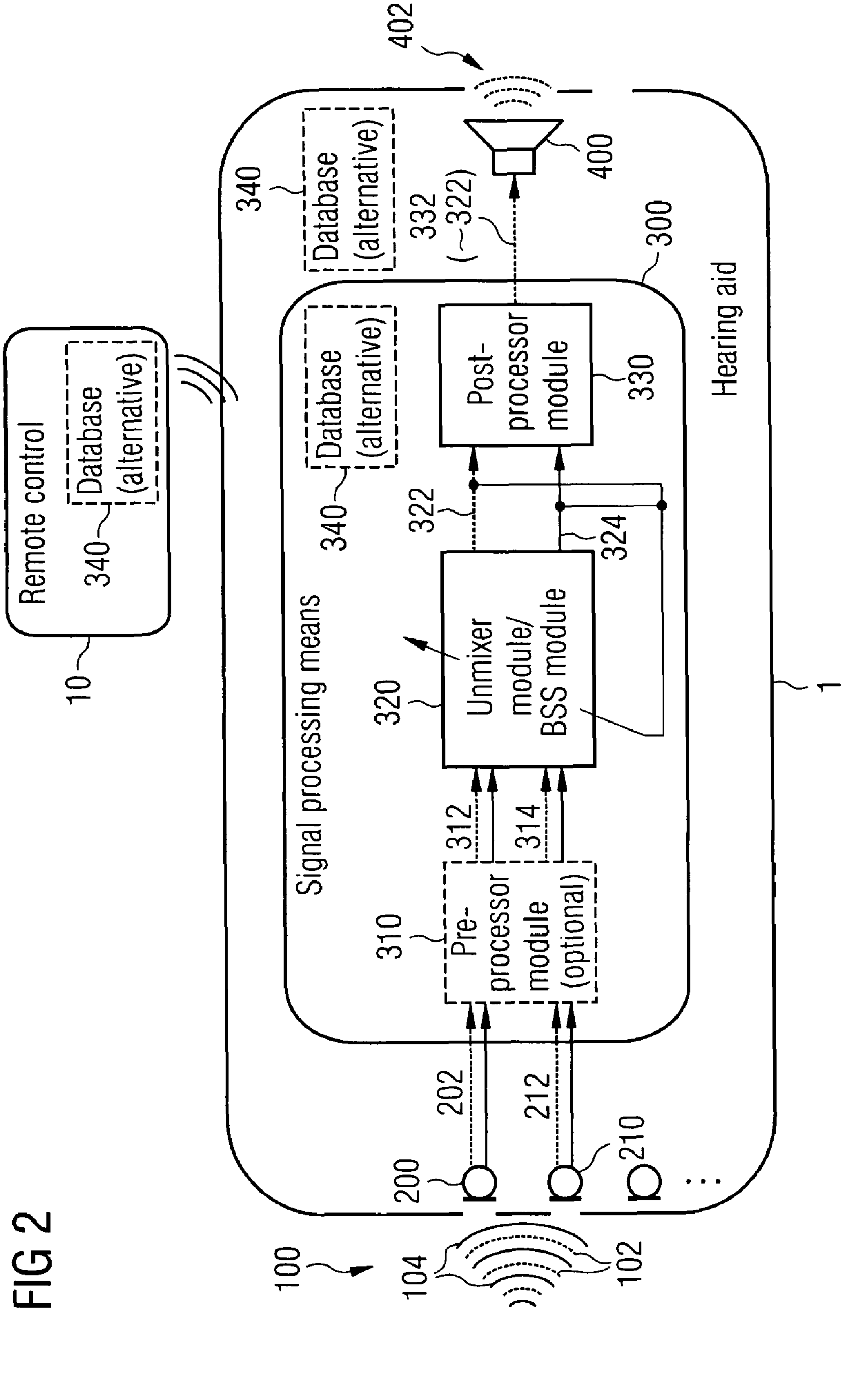
FIG. 2 is a block diagram of an inventive hearing aid having an inventive signal processing means in the act of processing an ambient sound having two acoustically mutually independent acoustic sources.

FIG. 2 now shows a first exemplary embodiment of the invention wherein located in a signal processing means 300 of the hearing aid 1 is an unmixer module 320, referred to below as a BSS module 320, connected downstream of which is a post-processor module 330. A pre-processor module 310 can herein again be provided that appropriately conditions or, as the case may be, prepares the input signals for the BSS module 320. Signal processing 300 preferably takes place in a DSP (Digital signal Processor) or an ASIC (Application Specific Integrated Circuit.

It is assumed in the following that there are two mutually independent acoustic 102, 104 or, as the case may be, signal sources 102, 104 in the ambient sound 100, with one of said acoustic sources 102 being a speaker source 102 of a speaker known to the hearing-aid wearer and the other acoustic source 104 being a noise source 104. The acoustic speaker source 102 is to be selected and tracked by the hearing aid 1 or signal processing means 300 and is to be a main acoustic component of the listening means 400 so that an output sound 402 of the loudspeaker 400 mainly contains said signal (102).

The two microphones 200, 210 of the hearing aid 1 each pick up a mixture of the two acoustic signals 102, 104—indicated by the dotted arrow (representing the preferred, acoustic signal 102) and by the continuous arrow (representing the non-preferred, acoustic signal 104)—and deliver them either to the pre-processor module 310 or immediately to the BSS module 320 as electric input signals. The two microphones 200, 210 can be arranged in any manner. They can be located in a single hearing device 1 of the hearing aid 1 or be arranged on both hearing devices 1. It is moreover possible, for instance, to provide one or both microphones 200, 210 outside the hearing aid 1, for example on a collar or in a pin, so long as it is still possible to communicate with the hearing aid 1. That also means that the electric input signals of the BSS module 320 do not necessarily have to originate from a single hearing device 1 of the hearing aid 1. It is, of course, possible to implement more than two microphones 200, 210 for a hearing aid 1. A hearing aid 1 consisting of two hearing devices 1 preferably has a total of four or six microphones.

The pre-processor module 310 conditions the data for the BSS module 320 which, depending on its capability, for its part forms two separate output signals from its two, in each case mixed input signals, with each of said output signals representing one of the two acoustic signals 102, 104. The two separate output signals of the BSS module 320 are input signals for the post-processor module 330, in which it is then decided which of the two acoustic signals 102, 104 will be fed out to the loudspeaker 400 as an electric output signal 332.

The post-processor module 330 for that purpose (see also FIG. 3) compares the electric acoustic signals 322, 324 simultaneously with acoustic signals/data of required or known speakers whose acoustic signals/data are/is stored in a database 340. If the post-processor module 330 identifies a known speaker or a known acoustic speaker source 102 in an electric acoustic signal 322, 324, meaning in the ambient sound 100, then it will select that electric speaker signal 322 and feed it out in a manner amplified with respect to other acoustic signals 324 as an electric output acoustic signal 332 (corresponds substantially to acoustic signal 322).

The database 340 in which speech profiles P of the speakers are stored is located in the post-processor module 330, the signal processing means 300, or the hearing aid 1. It is furthermore also possible, if a remote control 10 belongs to the hearing aid 1 or the hearing aid 1 includes a remote control 10 (which is to say if the remote control 10 is part of the hearing aid 1), for the database 340 to be accommodated in the remote control 10. That will indeed be advantageous because the remote control 10 is not subject to the same strict size limitations as the part of the hearing aid 1 located on or in the ear, so there can be more memory space available for the database 340. It will furthermore be made easier to communicate with a peripheral device of the hearing aid 1, for example with a computer, because a data interface needed for communication can in such a case likewise be located inside the remote control 10 (see also below).

Figure 3:
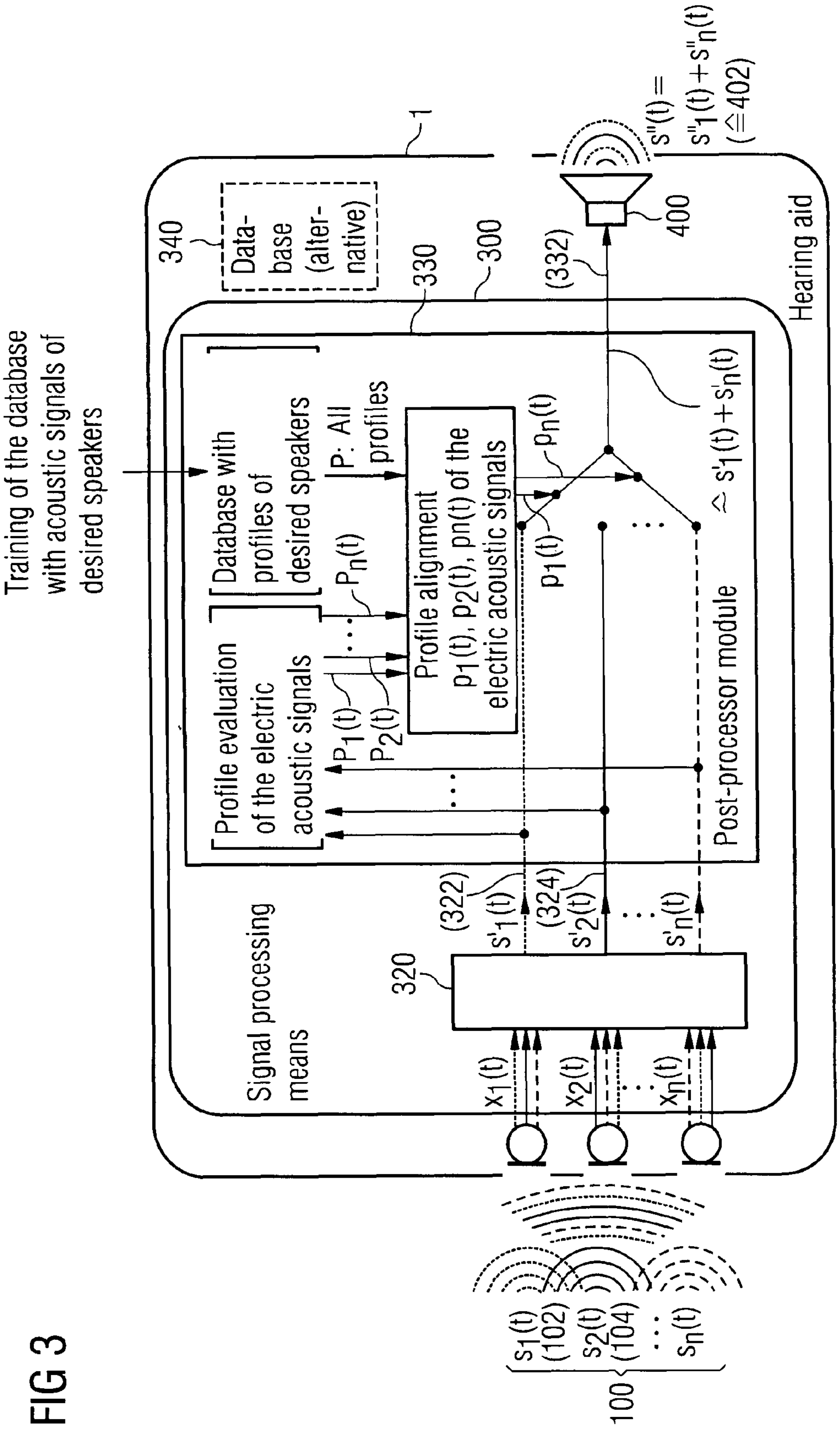
FIG. 3 is a block diagram of a second exemplary embodiment of the inventive hearing aid in the act of simultaneously processing three acoustically mutually independent acoustic sources in the ambient sound.

FIG. 3 shows the inventive method and the inventive hearing aid 1 in the act of processing three acoustic signal sources $s_1(t)$, $s_2(t)$, $s_n(t)$ which, in combination, form the ambient sound 100. Said ambient sound 100 is picked up in each case by three microphones, which each feed out an electric microphone signal $x_1(t)$, $x_2(t)$, $x_n(t)$ to the signal processing means 300. Although the signal processing means 300 herein has no pre-processor module 310, it can preferably contain one. (That applies analogously also to the first exemplary embodiment of the invention). It is, of course, also possible to process n acoustic sources s simultaneously via n microphones x, which is indicated by the dots ( . . . ) in FIG. 3.

The electric microphone signals $x_1(t)$, $x_2(t)$, $x_n(t)$ are input signals for the BSS module 320, which separates the acoustic signals respectively contained in the electric microphone signals $x_1(t)$, $x_2(t)$, $x_n(t)$ according to acoustic sources $s_1(t)$, $s_2(t)$, $s_n(t)$ and feeds them out as electric output signals $s'_1(t)$, $s'_2(t)$, $s'_n(t)$ to the post-processor module 330.

In the following, two electric acoustic signals, namely $s'_1(t)$ and $s'_n(t)$ (corresponding in this exemplary embodiment very largely to the acoustic sources $s_1(t)$ and $s_n(t)$), contain sufficient speaker information. That means that the hearing aid 1 is at least adequately capable of delivering an acoustic signal $s'_1(t)$, $s'_n(t)$ of said type to the hearing-aid wearer in such a way that he/she will be able to interpret the information contained therein adequately correctly, meaning will understand speaker information contained therein at least adequately. It is further possible when a multiplicity of acoustic signals $s'_1(t)$, $s'_n(t)$ containing adequate speaker information are present to select only those whose quality is the best or which the hearing-aid wearer prefers. The third acoustic signal $s'_2(t)$ (corresponding in this exemplary embodiment very largely to the acoustic source $s_2(t)$) contains no or hardly any usable speaker information.

The electric acoustic signals $s'_1(t)$, $s'_2(t)$, $s'_n(t)$ are then examined within the post-processor module 330 to determine whether they contain speech information of known speakers (speaker information). Said speech information of the known speakers is stored as speech profiles P in the database 340 of the hearing aid 1. The database 340 can therein in turn be provided in the remote control 10, the hearing aid 1, the signal processing means 300, or the post-processor module 330. The post-processor module 330 then compares the speech profiles P stored in the database 340 with the electric acoustic signals $s'_1(t)$, $s'_2(t)$, $s'_n(t)$ and, in this example, therein identifies the relevant electric speaker signals $s'_1(t)$ and $s'_n(t)$.

Preferably performed therein by the post-processor module 330 is a profile aligning wherein all speech profiles P in the database 340 are compared with the electric acoustic signals $s'_1(t)$, $s'_2(t)$, $s'_n(t)$. Preferably performed therein by the post-processor module 330 is a profile evaluating of the electric acoustic signals $s'_1(t)$, $s'_2(t)$, $s'_n(t)$ wherein the profile evaluating process produces acoustic profiles $P_1(t)$, $P_2(t)$, $P_n(t)$ and said acoustic profiles $P_1(t)$, $P_2(t)$, $P_n(t)$ can then be compared with the speech profiles P in the database 340.

If one of the electric acoustic signals $s'_1(t)$, $s'_2(t)$, . . . , $s'_n(t)$ contains a speaker known to the hearing aid 1, meaning if there are certain matches between the acoustic profiles $P_1(t)$, $P_2(t)$, . . . , $P_n(t)$ and one or more of the profiles P in the database 340, then the post-processor module 330 will identify the corresponding electric speaker signal $s'_1(t)$, $s'_n(t)$ and feed it as an electric acoustic signal 332 to the loudspeaker 400. The loudspeaker 400 in turn converts the electric output acoustic signal 332 into the output sound $s''(t)=s''_1(t)+s''_n(t)$.

The acoustic profiles $P_1(t)$, $P_2(t)$, $P_n(t)$ can be identified through production by the hearing aid 1 of probabilities $p_1(t)$, $p_2(t)$, $p_n(t)$ for the respective acoustic profile $P_1(t)$, $P_2(t)$, $P_n(t)$ with reference to the respective speech profiles P. That takes place preferably during profile aligning, which is followed by an appropriate signal selection. That means it is possible by means of the profiles stored in the database 340 to allocate a respective acoustic profile $P_1(t)$, $P_2(t)$, $P_n(t)$ a probability $p_1(t)$, $p_2(t)$, $p_n(t)$ of a respective speaker 1, 2, n. The electric acoustic signals $s'_1(t)$, $s'_2(t)$, $s'_n(t)$ corresponding at least to a certain probability of a speaker 1, 2, . . . , n can then be selected during signal selection.

In a preferred embodiment of the invention the hearing aid 1 can be put into a training mode in which the database 340 can be supplied with electric acoustic signals of required speakers. The database 340 can also be supplied with new speech profiles P of required or known speakers via a data interface of the hearing aid 1. It will as a result be possible for the hearing aid 1 to be connected (also via its remote control 10) to a peripheral device.

A blind source separation method is inventively preferably combined with a speaker classifying algorithm. That will insure that the hearing-aid wearer will always be able to perceive his/her preferred speaker or speakers optimally or most clearly.

It is furthermore possible to by means of the hearing aid 1 obtain additional information about which of the electric speaker signals 322; $s'_1(t)$, $s'_n(t)$ are preferably rendered to the hearing-aid wearer as output sound d 402, $s''(t)$. That can be an angle at which the corresponding acoustic source 102, 104; $s_1(t)$, $s_2(t)$, $s_n(t)$ impinges on the hearing aid 1, with certain such angles being preferred. Thus, for example, the 0° direction in which the hearing-aid wearer is looking or his/her 90° lateral direction can be preferred. The electric speaker signals 322; $s'_1(t)$, $s'_n(t)$ can be weighted to the effect—even apart from the different probabilities $p_1(t)$, $p_2(t)$, $p_n(t)$ that they contain speaker information (that of course applies to all exemplary embodiments of the invention)—as to whether one of the electric speaker signals 322; $s'_1(t)$, $s'_n(t)$ is predominant or a relatively loud electric speaker signal 322; $s'_1(t)$, $s'_n(t)$.

It is inventively not necessary to perform profile evaluating of the electric acoustic signals 322; 324; $s'_1(t)$, $s'_2(t)$, $s'_n(t)$ within the post-processor module 330. It is also possible, for example for reasons of speed, to have profile evaluating performed by another module of the hearing aid 1 and to leave just selecting (profile aligning) of the electric acoustic signal or signals 322, 324; $s'_1(t)$, $s'_2(t)$, $s'_n(t)$ having the highest probability or probabilities $p_1(t)$, $p_2(t)$, $p_n(t)$ of containing a speaker to the post-processor module 330. With that kind of exemplary embodiment of the invention, said other module of the hearing aid 1 ought, by definition, to be included in the post-processor module 330, meaning in that kind of exemplary embodiment the post-processor module 330 will encompass said other module.

The present specification relates inter alia to a post-processor module 20 as in EP 1 017 253 A2 (the reference numerals are those given in EP 1 017 253 A2), in which module one or more known speakers for an electric output signal of the post-processor module 20 is/are selected by means of a profile evaluating process and rendered therein at least amplified. See in that regard also paragraph [0025] in EP 1 017 253 A2. The pre-processor module and the BSS module can in the inventive case furthermore be structured like the pre-processor 16 and the unmixer 18 in EP 1 017 253 A2. See in that regard in particular paragraphs [0008] to [0024] in EP 1 017 253 A2.

The invention furthermore links to EP 1 655 998 A2 in order to make stereo speech signals available or, as the case may be, enable a binaural acoustic provisioning with speech for a hearing-aid wearer. The invention (notation according to EP 1 655 998 A2) is herein connected downstream of the output signals z1, z2 respectively for the right(k) and left(k) of a second filter device in EP 1 655 998 A2 (see FIGS. 2 and 3) for accentuating/amplifying the corresponding acoustic source. It is furthermore possible to apply the invention in the case of EP 1 655 998 A2 to the effect that it will come into play after the blind source separation disclosed therein and ahead of the second filter device. That means that a selection of a signal y1(k), y2(k) will therein inventively take place (see FIG. 3 in EP 1 655 998 A2).

The invention claimed is:

1. A method for operating a hearing aid, comprising:

providing a database of speech profiles of preferred speakers;

establishing a speaker operating mode via a signal processor of the hearing aid, the speaker operating mode for tracking and selecting an acoustic speaker source from an ambient sound;

generating electric acoustic signals by the hearing aid from the ambient sound detected by the hearing device; and selecting an electric speaker signal from the generated signals, the electric speaker signal selected by the signal processor via the database, wherein the selected signal is taken into account in an output sound of the hearing aid to be acoustically more prominent compared with unselected signals and thereby better perceived by a hearing-aid wearer.

2. The method as claimed in claim 1, wherein the speech profiles stored in the database are compared with the electric acoustic signals.

3. The method as claimed in claim 1, further comprising performing a profile evaluating of the electric acoustic signals by the signal processor such that each acoustic signal is allocated an acoustic profile.

4. The method as claimed claim 3, further comprising comparing the speech profiles in the database with the acoustic profiles by the signal processor, and during the comparison, determining for the respective electric acoustic signal a probability of containing a speaker.

5. The method as claimed in claim 4, wherein the signal having the highest probability of containing a speaker is output to be acoustically more prominent compared with other signals and thereby better perceived by a hearing-aid wearer.

6. The method as claimed in claim 1, wherein the speech profiles stored in the database have a ranking allocated by the hearing-aid wearer with which they are rendered via the hearing aid.

7. The method as claimed in claim 1, wherein the electric speaker signal or signals that are nearest the hearing-aid wearer or which impinge from a 0° angle in which the hearing-aid wearer is looking and will be made available to the hearing-aid wearer by the output sound.

8. The method as claimed in claim 1, wherein the signal processor chooses a subordinate acoustic source when no or too many electric speaker signals are selected, and wherein for the subordinate choice of acoustic source an electric acoustic signal is prioritized by at least one criterion selected from the group consisting of: volume, frequency range, frequency extremes, tonal range, octave range, a non-recognized speaker, a non-recognized speech, music, as great as possible freedom from interference; and similar spacing between mutually similar acoustic events.

9. The method as claimed in claim 1, further comprising unmixing the electric acoustic signals effective to separate different speakers from among the electric acoustic signals prior to selecting the electric speaker signal from the generated signals for the tracking of the speaker source, wherein a selected speaker is tracked regardless of a position of a user of the hearing aid in space.

* * * * *